United States Patent
Schneider et al.

(10) Patent No.: US 8,873,436 B2
(45) Date of Patent: Oct. 28, 2014

(54) ROUTING AND QUALITY DECISION IN MOBILE IP NETWORKS

(75) Inventors: Daniela Schneider, Vienna (AT); Karl-Heinz Nenner, Bornheim (DE)

(73) Assignee: T-Mobile International AG, Bonn (DE)

( * ) Notice: Subject to any disclaimer, the term of this patent is extended or adjusted under 35 U.S.C. 154(b) by 942 days.

(21) Appl. No.: 12/377,463

(22) PCT Filed: Jun. 15, 2007

(86) PCT No.: PCT/EP2007/005285
§ 371 (c)(1),
(2), (4) Date: May 21, 2009

(87) PCT Pub. No.: WO2008/019724
PCT Pub. Date: Feb. 21, 2008

(65) Prior Publication Data
US 2010/0067413 A1    Mar. 18, 2010

(30) Foreign Application Priority Data

Aug. 15, 2006 (DE) .......................... 10 2006 038 393

(51) Int. Cl.
| H04L 12/28 | (2006.01) |
| H04L 12/725 | (2013.01) |
| H04W 40/12 | (2009.01) |
| H04L 12/721 | (2013.01) |
| H04W 80/04 | (2009.01) |

(52) U.S. Cl.
CPC .............. *H04W 40/12* (2013.01); *H04L 45/308* (2013.01); *H04W 80/04* (2013.01); *H04L 45/12* (2013.01)

USPC ................ 370/310; 370/400; 726/11; 726/13

(58) Field of Classification Search
USPC ........................ 370/310; 726/11, 13
See application file for complete search history.

(56) References Cited

U.S. PATENT DOCUMENTS

| 6,731,653 B1 * | 5/2004 | Henderson et al. ........... 370/490 |
| 6,735,187 B1 * | 5/2004 | Helander et al. ............. 370/338 |
| 7,609,673 B2 * | 10/2009 | Bergenlid et al. ............. 370/329 |
| 2003/0225964 A1 * | 12/2003 | Krishnan et al. ............. 711/108 |
| 2006/0140177 A1 | 6/2006 | Karhu |

FOREIGN PATENT DOCUMENTS

| WO | 03/067832 | 8/2003 |
| WO | 2004/025982 | 3/2004 |

OTHER PUBLICATIONS

Examination Report dated Dec. 26, 2011 in corresponding Chinese Application No. 200780030320X.

* cited by examiner

*Primary Examiner* — Un C Cho
*Assistant Examiner* — Siming Liu
(74) *Attorney, Agent, or Firm* — Faegre Baker Daniels LLP

(57) ABSTRACT

A method for routing streams of traffic in IP networks, particularly in mobile IP networks. A plurality of streams of traffic to be transmitted are routed such that they are transmitted in one carrier/context. The streams of traffic having different destination networks are merged and are transmitted from a terminal via one carrier/context to a network access node in the IP network. They are routed from there to respective destination networks and devices.

11 Claims, 2 Drawing Sheets

ROUTING AND QUALITY DECISION IN MOBILE IP NETWORKS

Figure 1:
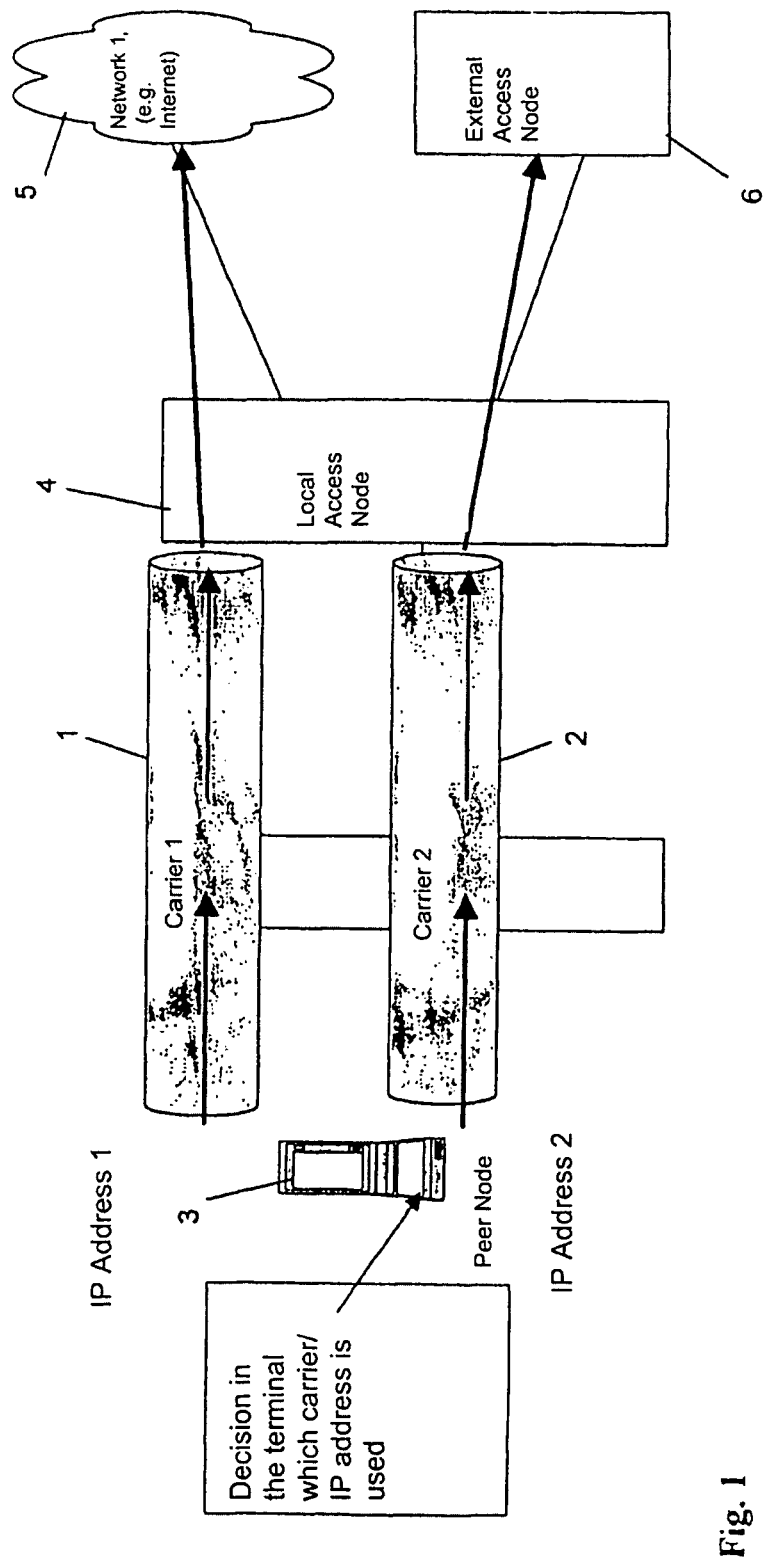

The invention relates to a method and a computer program for routing streams of traffic in IP networks, in particular in mobile IP networks, taking quality criteria into consideration.

State of the art communication networks, in particular mobile phone networks or the Internet, are in principle known for the transmission of information contents to various user instances, likewise the associated terminals.

For closer consideration of the inventive environment we proceed from the following scenario:

A terminal has a "context"/a "session" at a local network access point of a packet data network.

The terminal would like to establish or maintain a plurality of streams of traffic to one or more external networks (simultaneously or in succession) which must be treated differently ("external" refers to the view of the above named network access point). The different treatment of the streams of traffic can be necessary on the basis of the following circumstances:

The streams of traffic have different destination networks, e.g. a stream of traffic to the public Internet (local access), another to a corporate network/service network/Internet Service Provider (external access).

The QoS treatment (QoS: Quality of Service) of the streams of traffic is (must be) different, e.g. for stream of traffic 1 the QoS class 'Background class' is sufficient, for stream of traffic 2 the QoS class 'realtime class' is required.

National and international roaming: e.g. one stream of traffic is routed via the home network (external access), a second stream of traffic is routed can be routed to external networks at the local access point.

This differentiation of the streams of traffic can for example be based on the following criteria:
1. Differences in the IP header
2. Differences in the application header
3. Differences in the QoS handling
4. Differing contents (user data)
5. Different protocols
6. Additional criteria In FIG. 1 the process sequence of an end-terminal-based routing decision in accordance with the state of the art is illustrated as an example.

In accordance with the state of the art the following procedure is customary:

The terminal 3 is assigned an IP address and its own carrier/context 1, 2 for each stream of traffic to be differentiated. The destination network for the streams of traffic is in the process a parameter of a context and can be different for each context.

The local access node 4 in the mobile network routes the traffic corresponding to the used carrier/context to the respective destination network 5, 6. For example traffic from carrier 1 is routed via a local access to the public Internet 5, traffic from carrier 2 is routed to an external access 6 e.g. to a private input server of a corporate network.

The following are to be named as disadvantages of the state of the art in accordance with today's approach:

The terminal needs a separate context with specific IP address for each connection that goes to a separate network.

The routing decision must be made already in the terminal. The complexity in the terminal is correspondingly high. If now the same application is to be executed on both connections, there can be conflicts.

The mobile network has only limited control over the routing decision of the individual packets. In the best case it can decide whether a packet on the context used by the terminal is permissible.

Proceeding from this state of the art the invention is based on the object of specifying a new method with new rules and filter criteria for routing and filtering of streams of traffic in IP networks, in particular in mobile networks and a computer program for the carrying out of the new rules and filter criteria, in order to overcome the disadvantages of the state of the art.

This problem is solved by the method claimed in Claim 1. This method is characterized by the fact that a plurality of streams of traffic to be transmitted is routed in such a way that they are transmitted in one carrier/context.

The transmission of the streams of traffic takes place in the process regardless of whether they must be differentiated with regard to destination network and/or QoS. The transmission in one carrier/context takes place in particular on the air interface from the terminal to a network access node.

In addition in accordance with one form of the invention it is proposed that the local network access nodes of the network routs the streams of traffic with the help of rules and filter criteria to the correct destination. Rules (Policy) and filter criteria can be statically or dynamically configured in the respective network or by another network.

Advantageous embodiments of the invention are specified in the dependent claims.

The above named problem is furthermore solved by a computer program with a program code for the carrying out of the claimed method. The advantages of this solution correspond to the advantages named above with regard to the claimed method.

The advantages of the invention are, enumerated in abbreviated form, the following:

Full (flexible) network control in the case of routing decisions, based on configured rules (Policy) & filter criteria The terminal is assigned only one IP address Unnecessary complexity in the terminal is prevented. The terminal does not have to do any differentiation with regard to the destination network/routings; as a result the complexity in the terminal (hardware/software) is considerably lessened.

The possibility that the terminal cooperates or expresses its preferences in the decision about the QoS (quality of service) and/or destination network and/or routing is still given.

The method works uniformly both on networks with the possibility of several contexts per terminal (e.g. GPRS) as well as also on networks which do not support multiple contexts per terminal (e.g. WLAN).

Figure 2:
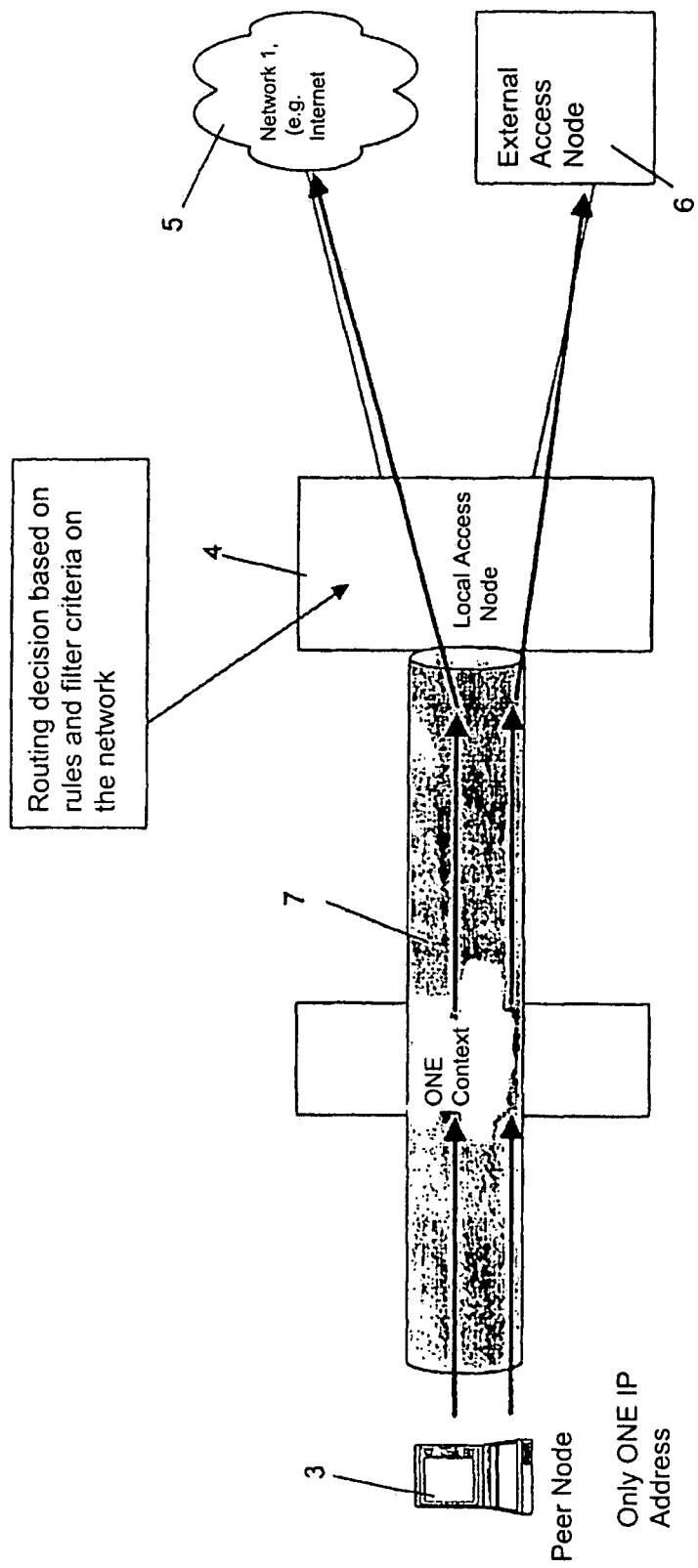

The invention is schematically represented in FIG. 2 and will be described in the following:

Proceeding from the terminal 3 (peer node) in contrast to conventional methods in accordance with FIG. 1 only a single IP address is used in order to be able to transmit different data to the IP network. The data stream consisting of several different streams of traffic is conducted in one single context/carrier 7 to a local access node 4. There, with the help of posted rules and filter criteria, which are for example stored in a memory device, a targeted delivery takes place for specific parts of the data stream to one of if necessary several network nodes of a first network 5. Other parts of the data stream are, on the basis of the posted rules and criteria, also guided to external access nodes 6.

The rules and criteria posted on the network for the routing of the individual streams of traffic can comprise:
Information in the IP header
Information in the application header
Criteria for QoS handling
The data contents (user data)
Protocols used In principle the number of destination networks in accordance with the invention is not limited.

In closing let it be pointed out that all of the individual aspects of the invention disclosed in the description—to the extent that they are useful—can also be combined with one another, even beyond the examples.

The invention claimed is:

1. A method for routing streams of Internet Protocol (IP) traffic in IP networks or in mobile IP networks, the method comprising:
routing a plurality of streams of traffic to be transmitted in such a way that they are transmitted utilizing one carrier or context,
merging and transmitting several different streams of IP traffic comprising packet data for different destination networks from a terminal via one carrier/context to a network access node of the IP network,
assigning the terminal only one IP address for transmitting the several different streams of IP traffic to the network access node, and wherein the transmission of the several different streams of traffic takes place in the method regardless of whether they must be differentiated with regard to destination network, and
configuring rules and filter criteria for statically or dynamically controlling a local network access node of the IP network by its own network or by another network, the rules and filter criteria being used for controlling routing and filtering of the different streams of IP traffic in the IP network.

2. The method according to claim 1, wherein the transmission of the different streams of traffic from the terminal to the network access nodes takes place via an air interface.

3. The method according to claim 2, wherein the number of the different streams of traffic routed together is not limited.

4. A non-transitory computer readable medium storing a computer program for the carrying out of the method according to claim 2.

5. The method according to claim 1, wherein the rules and filter criteria for controlling a local network access node and for controlling routing and filtering of the different streams of IP traffic in the IP network are stored in the local network access node.

6. The method according to claim 5, wherein the number of the different streams of traffic routed together is not limited.

7. A non-transitory computer readable medium storing a computer program for the carrying out of the method according to claim 6.

8. A non-transitory computer readable medium storing a computer program for the carrying out of the method according to claim 5.

9. A non-transitory computer readable medium storing a computer program for the carrying out of the method according to claim 1.

10. The method according to claim 1, wherein the number of the different streams of traffic routed together is not limited.

11. The method according to claim 1, wherein the rules and filter criteria for controlling routing and filtering of the different streams of IP traffic in the IP network include at least one of information in an IP header, information in an application header, a criteria for QoS handling, a data content, and a protocol.

* * * * *